United States Patent [19]
Barkman et al.

[11] Patent Number: 5,255,199
[45] Date of Patent: Oct. 19, 1993

[54] CUTTING TOOL FORM COMPENSATON SYSTEM AND METHOD

[75] Inventors: William E. Barkman, Oak Ridge; Edwin F. Babelay, Jr., Knoxville; Edward J. Klages, Oak Ridge, all of Tenn.

[73] Assignee: Martin Marietta Energy Systems, Inc., Oak Ridge, Tenn.

[21] Appl. No.: 628,525

[22] Filed: Dec. 14, 1990

[51] Int. Cl.$^5$ ............................................. G05B 19/18
[52] U.S. Cl. .................. 364/474.17; 382/8; 358/101; 358/106
[58] Field of Search ............ 364/474.17, 474.16, 364/474.18, 474.35; 358/101, 106, 107; 382/1, 8, 394

[56] References Cited

U.S. PATENT DOCUMENTS

| | | |
|---|---|---|
| 4,031,368 | 6/1977 | Colding et al. |
| 4,296,364 | 10/1981 | Fukuyama et al. |
| 4,370,721 | 1/1983 | Berenberg et al. |
| 4,620,281 | 10/1986 | Thompson et al. |
| 4,700,224 | 10/1987 | Miyasaka et al. |
| 4,736,625 | 4/1988 | Patterson et al. |
| 4,807,145 | 2/1989 | Takahashi et al. |
| 4,845,763 | 7/1989 | Bandyopadhyay |
| 4,864,813 | 9/1989 | Bailey et al. ............ 364/474.17 |
| 4,918,627 | 4/1990 | Garcia et al. |

FOREIGN PATENT DOCUMENTS

| | | | |
|---|---|---|---|
| 233403 | 9/1988 | Japan | 364/474.17 |
| 64-45549 | 2/1989 | Japan | |

*Primary Examiner*—Jerry Smith
*Assistant Examiner*—Thomas E. Brown
*Attorney, Agent, or Firm*—Michael E. McKee; George L. Craig; Harold W. Adams

[57] ABSTRACT

A compensation system for a computer-controlled machining apparatus having a controller and including a cutting tool and a workpiece holder which are movable relative to one another along a preprogrammed path during a machining operation utilizes a camera and a vision computer for gathering information at a preselected stage of a machining operation relating to the actual shape and size of the cutting edge of the cutting tool and for altering the preprogrammed path in accordance with detected variations between the actual size and shape of the cutting edge and an assumed size and shape of the cutting edge. The camera obtains an image of the cutting tool against a background so that the cutting tool and background possess contrasting light intensities, and the vision computer utilizes the contrasting light intensities of the image to locate points therein which correspond to points along the actual cutting edge. Following a series of computations involving the determining of a tool center from the points identified along the tool edge, the results of the computations are fed to the controller where the preprogrammed path is altered as aforedescribed.

6 Claims, 5 Drawing Sheets

CUTTING TOOL FORM COMPENSATON SYSTEM AND METHOD

This invention was made with Government support under Contract No. DE-AC05-84OR21400 awarded by the U.S. Department of Energy to Martin Marietta Energy Systems, Inc. and the Government has certain rights in this invention.

BACKGROUND OF THE INVENTION

This invention relates generally to the machining of workpieces and relates, more particularly, to computer-controlled machining operations wherein a cutting tool is moved relative to a workpiece along a predetermined, or preprogrammed, path to effect a cut in a workpiece held by the holder.

When a computer program is prepared for controlling the path of relative movement between the cutting tool and workpiece holder in a computer-controlled machining apparatus, the size and shape of the cutting edge of the tool is normally presumed not to experience changes during a machining operation or possess dimensional errors. Thus, the relative movement between the cutting tool and workpiece holder controlled by the program commonly does not compensate for wear-related changes in the cutting tool edge, such as may occur during a machining operation, or for imperfections in the cutting tool edge, such as may exist in a new cutting tool. In machining applications in which a relatively high degree of precision is required, the inability of such machining apparatus to compensate for changes and/or imperfections in the size and shape of a cutting tool edge may result in erroneous cutting of the workpiece and ultimately, in an unacceptable product.

It would be desirable to provide a computer-controlled machining apparatus wherein adjustments may be made to the preprogrammed path of relative movement between the cutting tool and workpiece holder for taking into account variations between the actual size and shape of the cutting edge during a machining operation and the assumed size and shape of the cutting edge upon which the preprogrammed path is based so that the dimensional accuracy of a product formed with the apparatus is enhanced.

Accordingly, an object of the present invention is to provide a system and method for a computer-controlled machining apparatus for generating information based upon the actual size and shape of the cutting tool edge at a preselected stage of a machining operation so that the preprogrammed path of movement between the cutting tool and the workpiece holder may be adjusted to take into account the actual size and shape of the cutting tool edge.

Another object of the present invention is to provide such a system and method wherein the information generated relating to the actual size and shape of the cutting tool edge utilizes an image of the tool edge.

Still another object of the present invention is to provide such a system wherein the components of the system utilized for generating information relating to the actual size and shape of the cutting tool edge is not required to contact the cutting tool during an information-gathering operation.

SUMMARY OF THE INVENTION

This invention resides in a compensation system and method for use in conjunction with a computer-controlled machining apparatus having a controller and including a cutting tool and a workpiece holder which are movable relative to one another along a preprogrammed path during a machining operation for effecting a cut in a workpiece held by the workpiece holder. The preprogrammed path of relative movement between the cutting tool and the workpiece holder is based upon an assumed size and shape of the cutting edge of the cutting tool and the controller includes a database including criteria relating to the assumed size and shape of the cutting edge.

The system of the invention includes means for obtaining an image of the cutting edge of the cutting tool at a preselected stage of a machining operation and for generating information relating to the actual size and shape of the cutting edge at the preselected stage from the obtained image. The system also includes means for comparing the generated information relating to the actual size and shape of the cutting edge with the assumed size and shape of the cutting edge and for altering the preprogrammed path of relative movement in accordance with variations detected between the actual size and shape of the cutting edge and the assumed size and shape of the cutting edge.

The method of the invention includes the steps of obtaining an image of the cutting edge of the cutting tool at a preselected stage of a machining operation and generating information relating to the actual size and shape of the cutting edge at the preselected stage from the obtained image. The generated information relating to the actual size and shape of the cutting edge is then compared with the criteria relating to the assumed size and shape of the cutting edge, and the preprogrammed path of relative movement is altered in accordance with variations detected between the actual size and shape of the cutting edge and its assumed size and shape.

DETAILED DESCRIPTION OF AN ILLUSTRATIVE EMBODIMENT

Figure 1A:
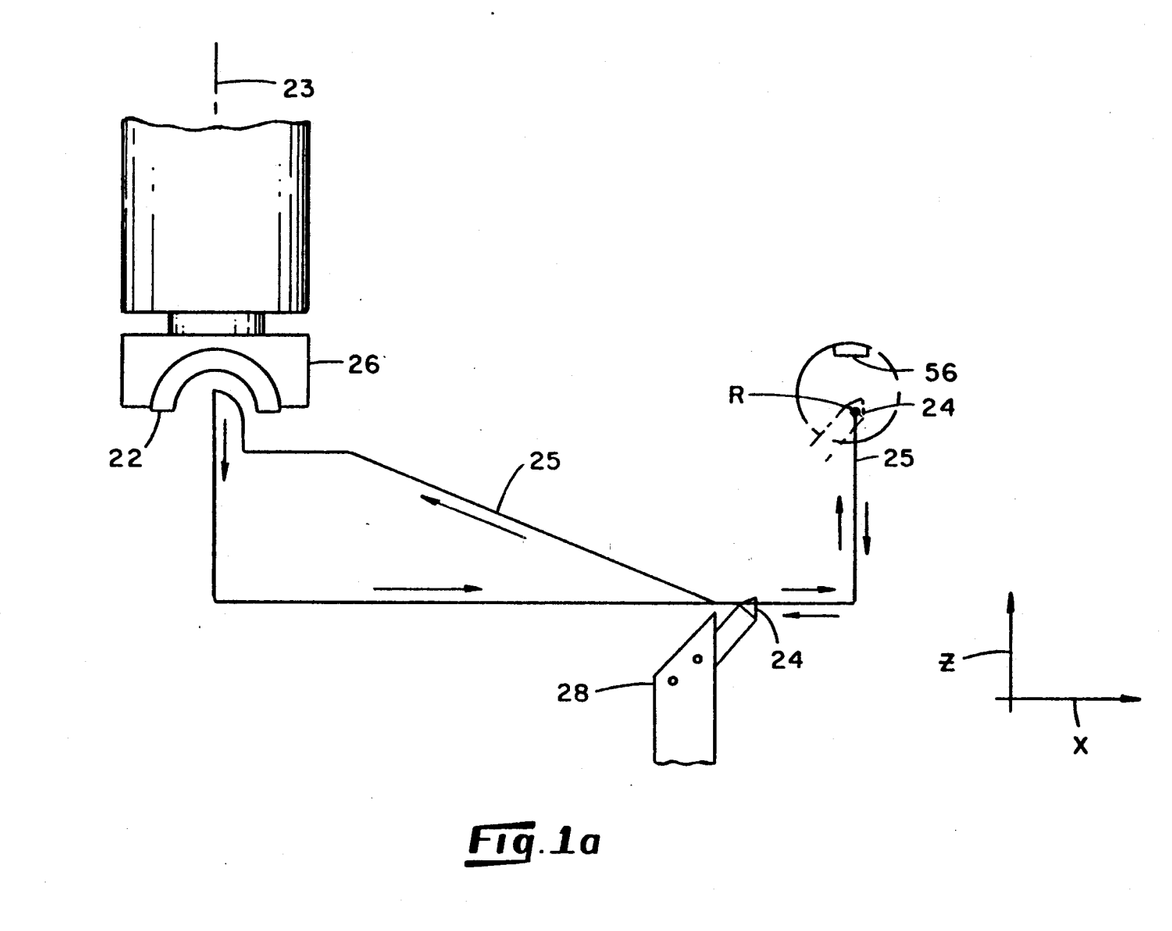
FIG. 1a is a schematic plan view of fragments of a machining apparatus within which an embodiment of a tool form compensation system is incorporated.
Figure 1B:
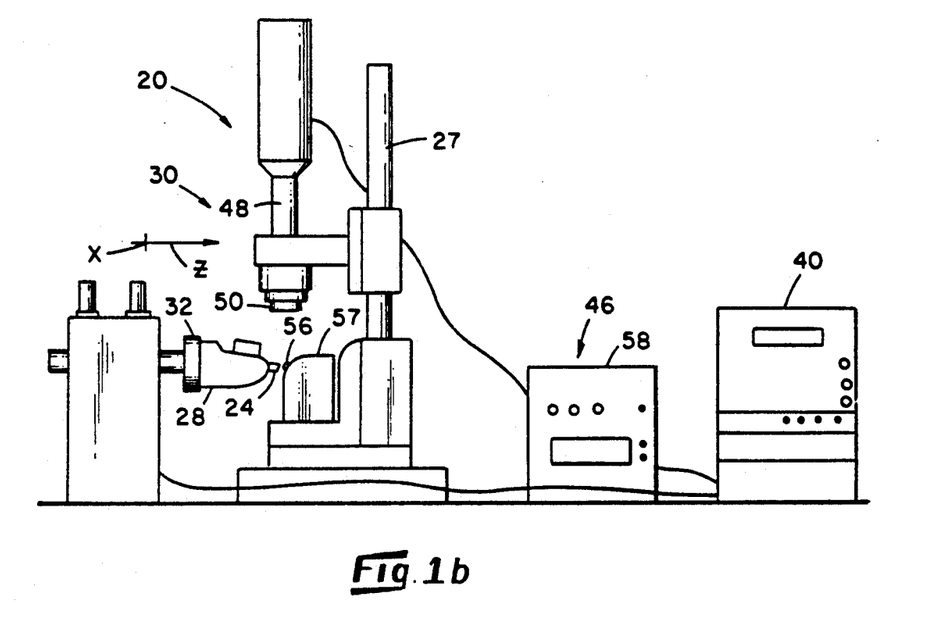
FIG. 1b is a schematic elevation view of the FIG. 2 machining apparatus and compensation system.

Referring now to the drawings in which like reference characters designate like or corresponding parts throughout the several views, there are shown in FIGS. 1a and 1b schematic overviews of a machining apparatus, indicated 20, employing a compensation system 30 in accordance with the present invention. The machining apparatus 20 includes a cutting tool 24 and means, indicated 26, for holding a workpiece 22 in a condition for being worked upon by the cutting tool 24. The cutting tool 24 is mounted within a tool holder 28 in a conventional manner which facilitates replacement of the tool 24 when desired.

Figure 2:
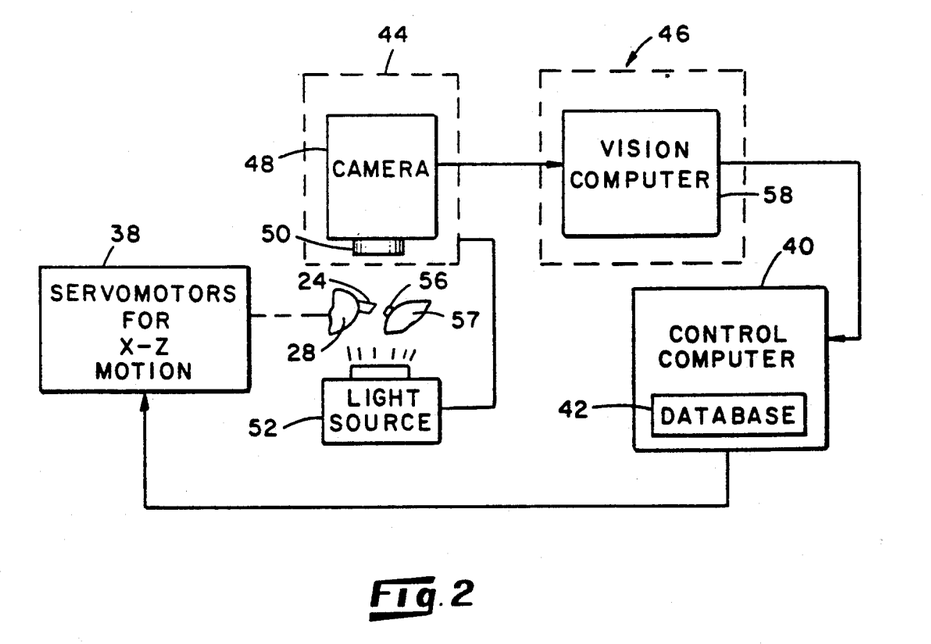
FIG. 2 is a schematic diagram illustrating the operation of the FIG. 1 apparatus.

The machining apparatus 20 also includes means for moving the tool holder 28 and workpiece holding means 26 relative to one another so that the cutting tool 24 effects a cut in the workpiece 22. The apparatus 20 resembles a T-base lathe in that its workpiece holding means 26 is in the form of a rotatable spindle mounted for rotation about an axis 23 and which is held in a stationary relationship with respect to a frame 27. The tool holder 28 is movable relative to the workpiece holding means 26 to positions at which the tool 24 engages the workpiece 22 so that material is removed from the workpiece 22 as the workpiece 22 is rotated about the axis 23. In the depicted apparatus 20, the tool holder 28 is supported by a mount 32 which is, in turn, slidably supported by guideways. Servomotors, indicated 38 in FIG. 2, are coupled between the carriage and guideways in a manner well known in the art for movement of the tool holder 28 along horizontal paths corresponding to coordinate directions indicated X and Z, respectively, in FIGS. 1a and 1b. (The X direction in FIG. 1b is perpendicular to the FIG. 1b view.) Therefore, by appropriately actuating the servomotors 38, the cutting tool 24 may be moved relative to the workpiece 22 to a desired X, Z coordinate position. The depicted machining apparatus 20 is particularly well-suited for the fabrication of precision contours of hemispherical configuration, but it will be understood that the principles of the present invention may be variously applied.

With reference to FIGS. 1b and 2, the machining apparatus 20 also includes a control computer 40 appropriately connected to the servomotors 38 for controlling the movement of the cutting tool 24 relative to the workpiece 22 so that the tool 24 moves in cutting engagement with the workpiece 22 along a preprogrammed path. In preparation of the cutting path program, criteria relating to the shape and size of the tool 24, as well as the center of the tool 24, is input into the computer database 42 so that the X, Z coordinate position of the cutting edge of the tool 24 may be predicted by the computer 40. It follows that the preprogrammed path of movement of the tool 24 takes into account a presumed, e.g. a theoretical, form of the cutting tool 24.

As will be apparent herein, the compensation system 30 generates data or information relating to the actual shape and size of the cutting edge of the cutting tool 24 during a machining operation. In this connection, the compensation system 30 includes an imaging subsystem 44 (FIG. 2) for obtaining an image of the edge of the cutting tool and a processing subsystem 46 to which the cutting tool image is fed. An analysis is performed upon the obtained image by the processing subsystem 46 for generating data representative of the form of the tool cutting edge responsible for removing material of the workpiece 22 when the tool 24 is moved thereacross. This generated data is subsequently sent to the control computer 40 where the programmed path of tool movement is adjusted to compensate for any change detected between the generated data and the size and shape which the cutting tool edge was presumed to possess when the programmed path was prepared.

An example of a processing subsystem 46 found to be suitable for processing the image in the manner described in detail herein is an IBM personal computer with a Data Translation Vision Board, but other equipment may be used.

With reference still to FIG. 2, the imaging subsystem 38 includes a downwardly-directed CCD video camera 48 disposed to one side of the workpiece holding means 26 and mounted in a stationary relationship relative thereto upon a frame. A microscope lens 50 is attached at the lower end of the camera 48 to obtain a close-up image of the cutting tool 24, and a small diffuse light source 52 is fixedly supported generally beneath the tool 24 and directed generally upwardly. With the tool 24 positioned between the camera lens 50 and the light source 52, the image of the cutting tool 24 received by the camera 48 is a shadow of the profile of the cutting tool 24 and, in particular, the profile of the cutting edge of the cutting tool 24. As exemplified by the image of FIG. 4, the shadow of the cutting tool 24 as depicted on the image observed by the camera 48 is dark whereas the background 54 of the image is light.

To initiate an imaging process with the imaging subsystem 44, the cutting tool 24 is moved beneath the camera 48 by the (and illustrated in phantom in FIG. 1a) at which the camera 48 is focused upon the tool edge. Such a position may be programmed within the computer 40 as a reference position, indicated R in FIG. 1a, to which the cutting tool 24 may be repeatedly returned When adjustments in the cutting tool path are desired to be made to compensate for any changes in tool size and shape. Therefore, when it is desired to generate data relating to the actual size and shape of the cutting tool edge, the computer 40 sends appropriate command signals to the servomotors 38 for moving the cutting tool 24 along the X-Z plane to the reference position. An image is then made of the cutting tool 24 and subsequently operated upon by the processing subsystem 46. Since the camera 40 in the depicted apparatus 20 is directed toward the cutting tool 24 along a vertical path oriented generally perpendicular to a plane containing the cutting edge of the tool 24, the image obtained of the actual tool edge extends along the edge of the tool shadow and is indicated 60 in FIG. 4. An exemplary path followed by the tool 24 between the workpiece 22 and the reference position R is indicated 25 in FIG. 1a.

Although an image of the cutting tool 24 may be obtained at any desired stage of a machining operation, such as at the completion of one or more passes of the cutting tool 24 across the workpiece 22, it has been found that an accurate work product may be obtained with one image of the cutting tool 24 obtained immediately prior to the last, or finishing, pass of the tool 24 across the workpiece 22. With information relating to the cutting tool image obtained before a machining pass of the cutting tool 24 across the workpiece 22, subsequent inspection/compensation of the cutting tool 24 take into account the wear-related changes in the cutting tool edge experienced as a result of each machining pass. It has been found that the cutting edge of a new cutting tool is likely to wear rapidly during the initial moments of its use. Therefore, use of the tool 24 for a short period of time, e.g., throughout one pass of the tool 24, before compensations to the programmed cutting path are made is likely to yield a tool geometry which is relatively stable throughout subsequent passes. With information relating to the cutting edge image obtained prior to the final pass of the cutting tool 24, the very pass responsible for the finished dimensions of the product, takes into account the actual size and shape possessed by the cutting tool edge prior to the final pass.

As mentioned earlier, the processing subsystem 46 receives the image obtained by the imaging subsystem 44 and performs a series of operations upon the image. To this end and with reference to FIG. 2, the processing subsystem 46 includes a vision computer 58 which includes means, indicated 62 in FIG. 3, for finding the tool cutting edge within the image. In this connection, the edge finding means 62 includes means for scanning the image in search of locations at which light intensity transitions occur. Although any of several known techniques may be employed for identifying locations in the image at which such intensity transitions occur, the edge finding means 62 of the depicted compensation system 30 utilizes general gray-scale interpolation techniques involving a scanning of a preselected portion of the image along a series of paths extending in first direction across the image and along a series of paths extending in a second direction across the image wherein the first and second directions are orthogonal to one another.

Figure 4:
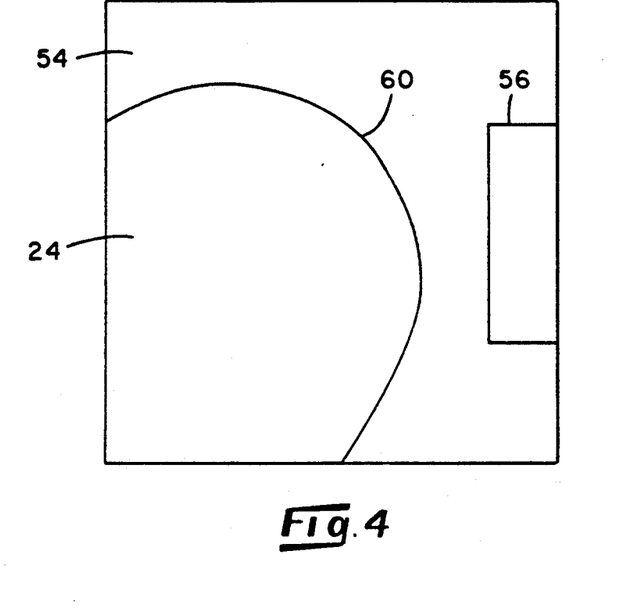
FIG. 4 is an exemplary image as viewed through the camera of the FIG. 1 apparatus.
Figure 5:
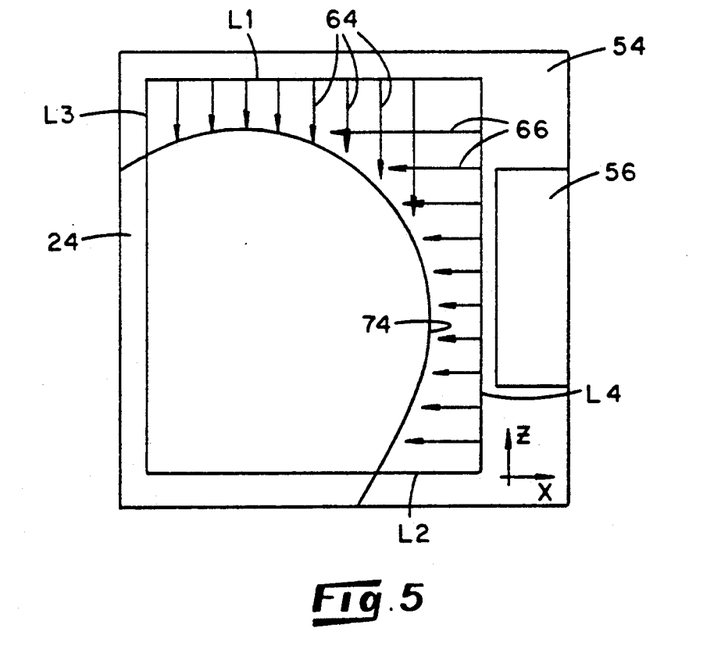
FIG. 5 is a view similar to that of FIG. 4 illustrating scan line paths followed during an edge-identifying operation of the FIG. 3 compensation system.

More specifically and with reference to the exemplary image illustrated in FIG. 4 and reproduced in FIG. 5, the edge finding means 62 scans the image along parallel lines, indicated 64 in FIG. 5, extending vertically across the image between lines designated L1 and L2 in FIG. 5 situated adjacent the top and bottom of the image and scanning the image along parallel lines, indicated 66 in FIG. 5, extending horizontally across the image between lines indicated L3 and L4 in FIG. 5 situated adjacent the right side and left side of the image. As the lines are scanned as aforedescribed, the edge finding means 62 detects transitions from light to dark, or vice-versa, as the scanning means scans across the image of the tool edge between the shadow of the tool 24 and the background 54 and identifies such transitions as edge points for further processing.

The image is sampled by the vision computer 58 into a 512 × 480 pixel array and resolution of the image is approximately 100 micro inches per pixel. However, the gray-scale interpolation techniques employed by the edge finding means 62 extend the effective system resolution to about 10 micro inches and a 3-sigma accuracy of better than about 30 micro inches. In practice, the edge finding means 62 collects approximately 600 sets of X and Z coordinate pairs that identify the edge of the tool within the FIG. 4 image.

Figure 3:
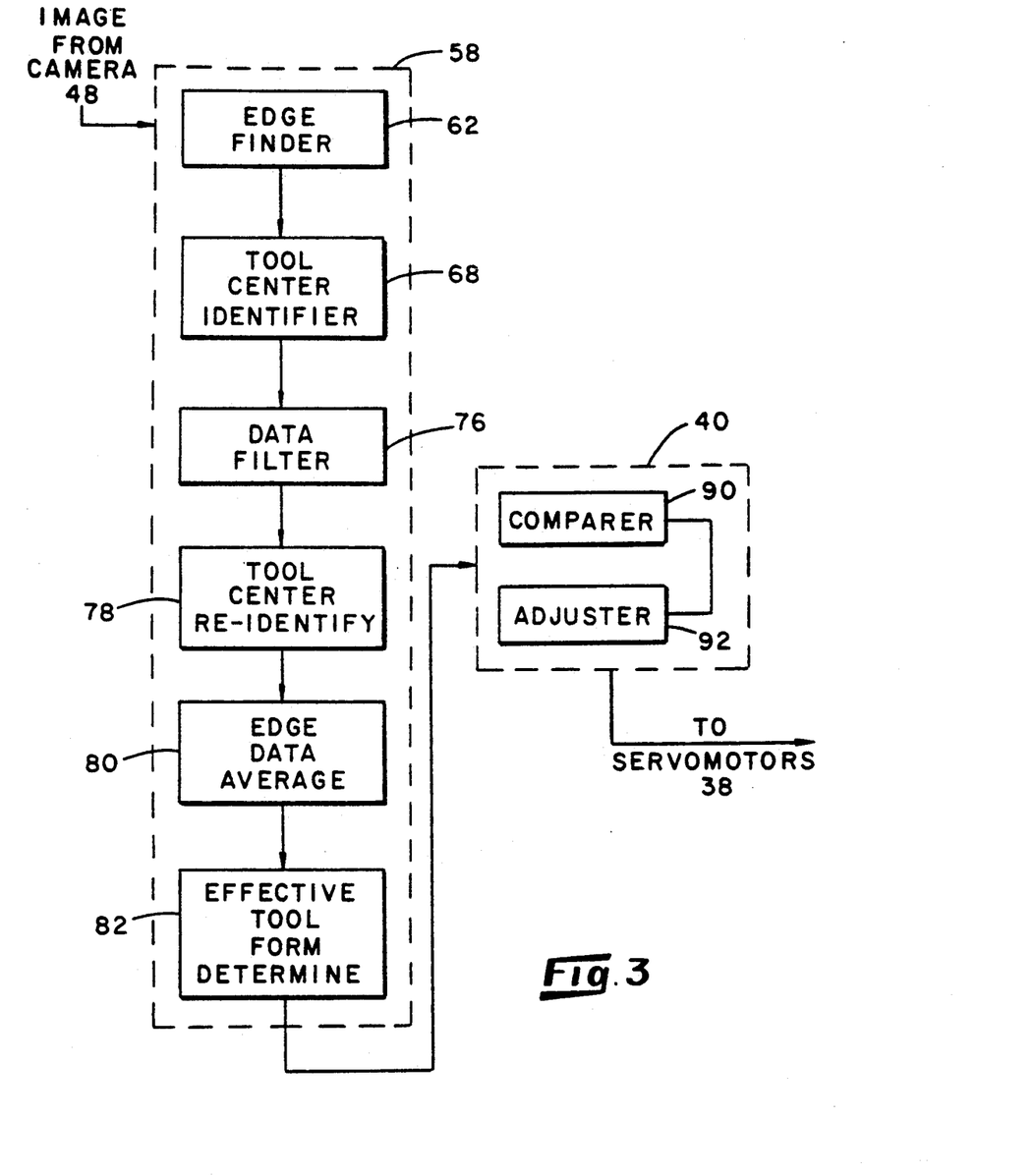
FIG. 3 is a schematic diagram illustrating the operation of the tool form compensation system of the FIG. 1 apparatus.

With reference still to FIG. 3, there is provided within the image transmitted to the processing subsystem 46 a wire artifact 56 of predetermined diameter (such as, for example, 0.02 inches). Permanently mounted within the camera field of view by means of a holder 57 (FIGS. 1b and 2), the wire 56 provides the processing subsystem 46 with a scale calibration and a spatial reference. In other words, the wire 46 permits the processing subsystem 46 to execute dimensional calibration operations and is advantageous in this regard.

Figure 6:
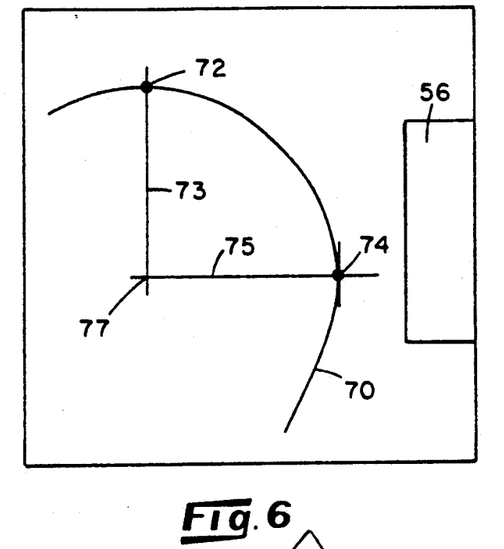
FIG. 6 is an exemplary image of the reference points identified by the compensation system from the FIG. 4 image as the tool cutting edge.

After the edge finding means 62 has located the edge points of the tool 24 from the image, further processing of the data is performed to calculate the tool geometry. One such process is to establish the tool center, or inspection datum, which will be a reference location for subsequent tool form calculations. To this end and with reference to FIG. 3, the vision computer 58 includes means, indicated 68, for locating the center of the tool from the edge points collected from the edge finding means 62. An understanding of the operation of the center locating means 68 may be best understood with reference to FIG. 6 in which edge points identified by the edge finding means 62 extend along an edge line indicated 70. Of the edge points identified, two points, indicated 72 and 74, are indicated along the image line 70 which correspond to the tool edge points that define the cutting plane for the X and Z slide motions. The center locating means 68 identifies these two points 72 and 74 as tangential edge points with regard to the paths along which the image is scanned, and orthogonal lines 73 and 75 are then drawn through these two reference points 72 and 74. The point, indicated 77, at which the orthogonal lines 73 and 75 intersect and which will normally lie at a distance from the tool edge line 70 equal to about the nominal tool radius is recognized by the center locating means 68 as the tool center. Due to the accuracy with which the tool center is calculated by the center locating means 68, this center locating process is preferred over some other technique such as a "best-fit" approach involving the curve-fitting of a model, such as a circle or an ellipse, to the edge point data identified by the edge finding means 62.

With reference again to FIG. 3 and in accordance with the present invention, the vision computer 58 includes filter means 76 for effectively removing inaccurate edge point data from the collected data points relating to the cutting tool edge. The identification of such inaccurate edge points (a problem not uncommon to vision computers) is usually the result of detection of edge points as a line is scanned by the edge finding means 62 which is almost tangent to the image outline of the cutting edge. For example and with reference again to FIG. 5, a scanning of the image along the indicated Z coordinate direction adjacent the image point indicated 74 may result in the sensing of image transitions which are not, in fact, points along the cutting tool edge. In contrast, the obtaining of edge point data with scan lines oriented generally perpendicular to the image edge are known to be relatively accurate. It is therefore the function of the data filter means 76 to remove these inaccurate tangent edge points to increase the accuracy of measurement calculations subsequently performed with the vision computer 58.

With knowledge of the scan paths along which the data points are collected by the edge finding means 62 and the location of the tool center determined by the center locating means 68, the filter means 76 performs a check upon each collected data point to determine whether the checked point is one of the aforementioned tangent edge points. If, for example, the filter means 76 determines that one scan path is located from the calculated tool center which is about equal to the nominal radius of the tool, then the data point collected along that one scan path is identified as a tangent edge point and is removed from the collected data set.

Once the tangent edge points have been removed from the collected data set, a new tool center is calculated for subsequent calculations. To this end, the vision computer 58 includes means, indicated 78, for recalculating the tool center with the data points which remain after the tangent edge points have been removed by the data filter means 76. It has been found that the data filter means 76 typically removes approximately 100 data points from the 600 data points previously gathered by the edge finding means 62 and has been demonstrated to improve the total measurement accuracy of the compensation system 30 by a factor of about four.

With reference still to FIG. 3, the vision computer 58 also includes means, indicated 80, for averaging the edge data of the collected data set for subsequent transmission to the control computer 40. In the depicted compensation system 30, such averaging is useful because the control computer 40 is normally adapted to receive information reported in one degree increments (polar coordinates) as measured from a calculated tool center while the resolution of the vision computer 58 as identified by way of the edge finding means 62 collects edge point data at approximately 0.2 degree increments. In performing this averaging operation, the averaging means 80 first transforms the collected edge points, i.e., the about 500 edge points remaining in the set after the operation of the filter means 76, from the X-Z rectangular coordinate scheme into polar coordinates referenced to the tool center as identified by the center relocating means 78. A simple arithmetic average is then performed upon all edge points that fall within a two degree window centered on the angle of interest.

More specifically, the edge data averaging means 80 starts a loop that averages data points identified as being contained within a two degree window that begins at a physical angle of minus 60 degrees on the tool image as referenced from the identified tool center and ends at a physical angle of 150 degrees. To begin the averaging process, each of the about 500 identified edge points are examined and if any of the points are found to be located within a two degree window at minus 60 degrees, these points are averaged together to calculate a single average value that will be transmitted to the computer 40 for an angle of interest of minus 60 degrees. The angle of interest is then increase in one degree increments and the process is repeated for all 500 edge points. The final result is a set of averaged polar coordinate points comprising an average tool profile extending in one degree increments from an angle of minus 60 degrees to 150 degrees. It will be appreciated that by using a two degree window and stepping the process in one degree increments will induce data overlap in the averaging. This overlapping is advantageous in that it provides a smoothing or filtering effect on the tool profile which better characterizes the physical form of the tool. In addition, the data collected outside of the zero to ninety degree tool set locations (i.e., the data for the angular range of minus 60 to minus one degree and the range of ninety-one to 150 degrees) is used in the vision computer 58 to link the edge point data collected for the zero to ninety degree range to corresponding points in the assumed tool edge profile.

The vision computer 58 also includes means, indicated 82, for determining an effective tool form defined as the tool profile that is presented to the workpiece 22 during a pass thereacross. In other words, the effective tool form is the tool profile which actually effects the workpiece contour. For example, the physical tool profile may differ from the effective tool profile if the tool possesses a small fracture along the tool edge. While machining with the tool at the area of the small fracture, an amount of a material may be assumed to be left on the workpiece because a portion of the tool is missing at the site of the fracture. However, in a typical machining process, a large portion of the tool is always cutting the workpiece. Therefore, even in the area of a fracture along the tool edge, adjacent areas of the tool edge are influencing the part contour. The effective tool form determining means 82 analyzes the physical tool profile which may include areas of fractures or other localized discontinuities, to determine an effective tool profile that better characterizes the physical tool form.

Figures 7, 8:
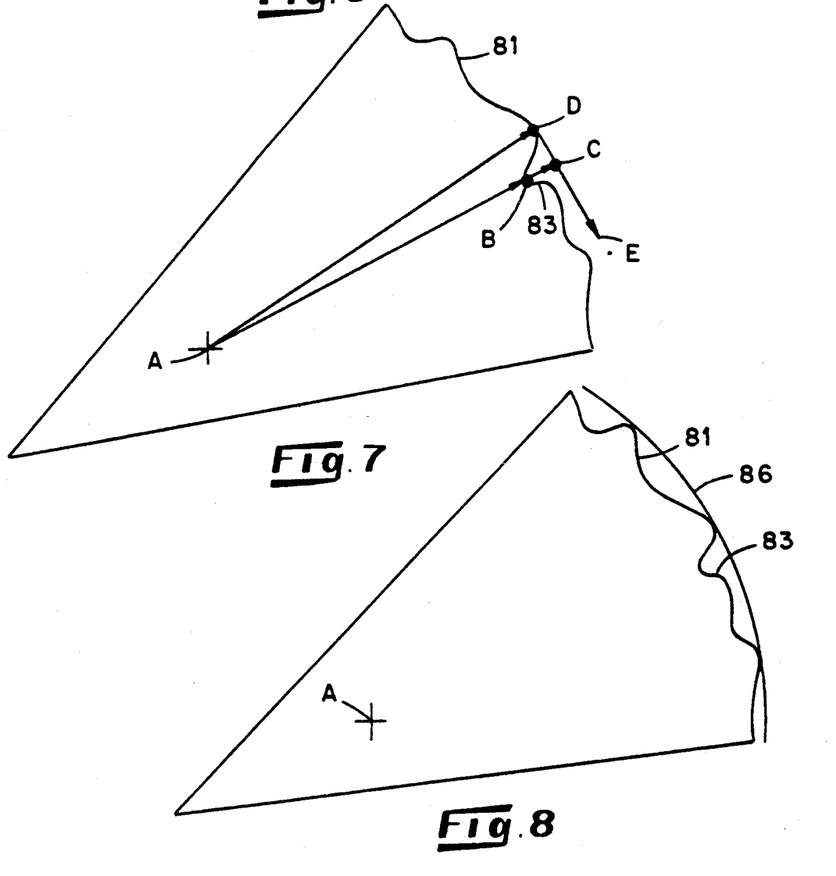
FIG. 7 is an exemplary image of the camera-viewed edge of an alternative cutting tool.
FIG. 8 is a view similar to that of FIG. 7 upon which arcuate segments have been superposed for providing an effective tool edge.

The effective tool form-determining means 82 may be best understood with reference to FIG. 7 in which a magnified cross section of a tool edge, indicated 81, is illustrated as possessing several local fractures, such as that indicated 83. The point location at which the center of the tool is calculated by the tool center identification means 68 is represented by point A and the cutting direction of the tool is indicated by the line CE. Since the line AB is perpendicular to the tool direction CE, the intersection of the line AB with point B along the tool edge 81 would normally define a cutting point along the edge of the tool. However, in this example, point B is located within the fracture 83 defined along the cutting edge 81 so that it will be point D that actually contacts the workpiece and determines the workpiece profile. The effective tool radius through point B is therefore AC and not AB. The potential error for considering the effective tool radius through point B as the magnitude of AB instead of the magnitude of AC can be substantial in some instances. When analyzed by the vision computer 58, the magnitude of AC is calculated by the tool form determining means 82 from the tool radius AD projected onto AB (radius AD times the cosine of the angle included between AD and AB).

To calculate the effective tool profile along the entire cutting edge, the effective tool form determining means 82 processes the previously-calculated average tool profile in a software loop. For each angle of interest, the determining means 82 examines an angular section of the average profile and the group of average points which are contained within the angular section to determine the largest distance that any point in this group is located from the tool center. This largest distance is thereafter identified by the determining means 82 as a maximum effective radius for points of an effective tool form extending along the angular section. Therefore, at the completion of this analysis loop, the effective tool form determining means 82 will have collected a series of maximum effective radii including the maximum effective radius at each angle of interest. While the size of the examined angular section for each angle of interest may be arbitrarily selected, it should be large enough to include points along a tool edge located on either side of a fracture. However, increasing the size of the angular section normally does not change the values obtained for the effective radius since only a single maximum value is considered rather than an average value. An angular section of about 60 degrees has been found to be suitable for the determination of the maximum effective radius for each angle of interest.

With a series of maximum effective radii having been determined across a sector of the cutting edge image, the effective tool form determining means 82 replaces cutting edge data which would otherwise reflect a fracture along the cutting edge of an actual tool with cutting edge data corresponding to too "high points". By way of example, there is illustrated in FIG. 8 a sector of the tool image of FIG. 7 along which a path, indicated 86, of data points has been identified wherein each data point along the path 86 is located at a distance from the tool center A equal to the maximum effective radius for an angular section which includes the point.

Once the data points defining the effective tool form have been determined, the data points are sent to the control computer 40 for each degree increment from the zero to the ninety degree tool set locations. Hence, ninety-one inspection points are transmitted to the control computer 40. The control computer 40 then uses the data points to identify deviations between the effective tool shape and the form that the tool edge was assumed to possess when the program for the cutting tool path was prepared. For the identification of such deviations and with reference again to FIG. 3, the control computer 40 includes comparison circuits 90 which compare the information received from the vision computer 58 to the criteria contained within the database 42 (FIG. 2) relating to the assumed size and shape of the cutting tool. Once those deviations are identified, the control computer 40 alters, by way of tool path adjustment means 92, the preprogrammed cutting path of the tool so that subsequent passes of the cutting tool across the workpiece 22 take into account the identified deviations between the effective tool form and the assumed tool form. The means and methods by which a preprogrammed cutting path may be altered given the identification of differences between an actual tool form (or as in this case, an effective tool form) and an assumed tool form are known so that a more detailed description of this function of the control computer 40 is not believed to be necessary.

It follows from the foregoing that the aforedescribed system 30 when incorporated within the computer-controlled machining apparatus 20 accomplishes its intended objects and objectives. More specifically, the system 30 obtains an image of the cutting edge of the cutting tool at a preselected stage of a machining operation and generates information relating to the actual size and shape of the cutting edge from the obtained image. Upon comparing the generated information with the preprogrammed criteria relating to the assumed size and shape of the cutting edge and identifying variations between the generated information and the preprogrammed criteria, adjustments are made to the preprogrammed path of movement between the cutting tool 24 and workpiece 22 to account for the identified variations. Moreover, because the components of the system 30, e.g. the camera 40, used for obtaining the image of the cutting tool 24 is not required to contact the cutting tool 24 during an image-obtaining operation, the system 30 is not likely to damage the tool edge, such as may be the case in tool measurement systems involving tool-contacting probes. Still further and in contrast to tool set-up systems which require that the cutting tool being measured be constructed of an electrically-conductive material, the system 30 may be effectively utilized in applications involving cutting tools constructed from non-conductive materials, such as ceramics.

It will be understood that numerous modifications and substitutions can be had to the aforedescribed embodiments without departing from the spirit of the invention. Accordingly, the aforedescribed embodiments are intended for the purpose of illustration and not as limitation.

What is claimed is:

1. In a computer-controlled machining apparatus having a controller and including a cutting tool and a workpiece holder which are movable relative to one another along a preprogrammed path during a machining operation for effecting a cut in a workpiece held by the workpiece holder wherein the preprogrammed path of relative movement between the cutting tool and workpiece holder is based upon an assumed size and shape of the cutting edge of the cutting tool and the controller includes a database including criteria relating to the assumed size and shape of the cutting edge, the improvement comprising:

means for obtaining an image of the cutting edge of the cutting tool at a preselected stage of a marching operation;

means for generating information relating to the actual size and shape of the cutting edge at the preselected stage from the obtained image including means for obtaining an image of the cutting tool against a background so that the cutting tool and the background within the image possess contrasting light intensities, and wherein the image-obtaining means includes a light source and a camera having a lens so that by positioning the cutting tool between the lens of the camera and the light source, the cutting tool image received by the camera is a shadow of the cutting tool edge; and means for comparing the generated information relating to the actual size and shape of the cutting edge with the criteria relating to the assumed size and shape of the cutting edge and for altering the preprogrammed path of relative movement in accordance with variations detected between the actual size and shape of the cutting edge and the assumed size and shape of the cutting edge;

the means for generating information includes means for scanning the obtained image along predetermined paths and identifying and collecting as data points along the cutting edge those points along each path at which sharp light intensity transitions occur;

the means for scanning includes means for scanning the image in one direction thereacross along a set of parallel paths and in another direction thereacross along another set of parallel paths wherein said one direction and another direction are orthogonal to one another; and the means for generating information includes means for determining a center of the tool with the collected data points and means for removing from the collected data points those points which were collected from the image along paths oriented generally tangentially along the image of the cutting edge and includes means for redetermining a center of the cutting tool with the point data remaining after the removal of the tangentially-collected points.

2. The improvement of claim 1 wherein said means for generating information includes means for averaging, out of the remaining data points, the data points collected along a predetermined angular sector of the image wherein said angular sector is measured from the redetermined tool center.

3. The improvement of claim 2 wherein said means for generating includes means for determining an effective tool form from the averaged data points by identifying as edge points of the effective tool form those points contained within an angular increment of the image as measured about the redetermined tool center and which are located form the redetermined tool center at a radius equal to the largest distance that any point of the averaged data points contained within the angular increment is located from the redetermined tool center so that said comparing means compares the edge point locations of the effective tool form with the edge point locations of the assumed tool form.

4. In a machining operation including the steps of moving a cutting tool and a workpiece holder relative to one another along a predetermined path to effect a cut in a workpiece held by the holder and wherein the predetermined path is based upon criteria relating to an assumed size and shape of the cutting tool, the improvement comprising:

obtaining an image of the cutting edge of the cutting tool at a preselected stage of the machining operation wherein the image of the cutting tool is obtained against a background so that the cutting tool and the background within the image possess contrasting light intensities, and wherein said step of obtaining an image includes the steps of providing a light source and a camera having a lens and positioning the cutting tool between the lens of the camera and the light source so that the cutting tool image received by the camera is a shadow of the cutting tool edge;

generating information relating to the actual size and shape of the cutting edge from the obtained information;

comparing the generated information relating to the actual size and shape of the cutting edge with the criteria relating to the assumed size and shape of the cutting edge; and altering the predetermined path of relative movement between the cutting tool and workpiece holder in accordance with variations detected between the actual size and shape of the cutting edge and the assumed size and shape of the cutting edge;

said step of generating information includes a step of scanning the obtained image along predetermined paths and identifying and collecting as data points along the cutting ege those points along each path at which sharp light intensity transitions occur;

said step of scanning includes the steps of scanning the image in one direction thereacross along a set of parallel paths and in another direction thereacross along another set of parallel paths wherein said one direction and said another direction are orthogonal to one another; and said step of generating information includes the steps of determining a center of the tool with the data points collected and removing from the collected point data those points which were collected form the image along paths oriented generally tangentially along the image of the cutting edge and a step of redetermining a center of the cutting tool with the point data remaining after the removal of the tangentially-collected points.

5. The improvement of claim 4 wherein said step of generating information includes a step of averaging, out of the remaining data points, the data points collected along a predetermined angular sector of the image wherein said angular sector is measured from the redetermined tool center.

6. The improvement of claim 5 wherein said step of generating includes a step of determining an effective tool form from the averaged data points by identifying as edge points of the effective tool form those points contained within an angular increment of the image as measured about the redetermined tool center and which are located from the redetermined tool center at a radius equal to the largest distance that any point of the averaged data points contained within the angular increment is located from the redetermined tool center so that said step of comparing compares the edge point locations of the effective tool form with the edge point locations of the assumed tool form.

* * * * *